(No Model.)  3 Sheets—Sheet 1.

W. H. H. KNIGHT.
ASPHALT MIXING MACHINE.

No. 293,180.  Patented Feb. 5, 1884.

Attest:
Z. Fenno,
W. J. Spencer

Inventor:
W. H. H. Knight (No Model.) 3 Sheets—Sheet 2.

W. H. H. KNIGHT.
ASPHALT MIXING MACHINE.

No. 293,180. Patented Feb. 5, 1884.

Attest:
Z. Fenno,
W. T. Spencer

Inventor:
W. H. H. Knight (No Model.)   3 Sheets—Sheet 3.
W. H. H. KNIGHT.
ASPHALT MIXING MACHINE.
No. 293,180.   Patented Feb. 5, 1884.
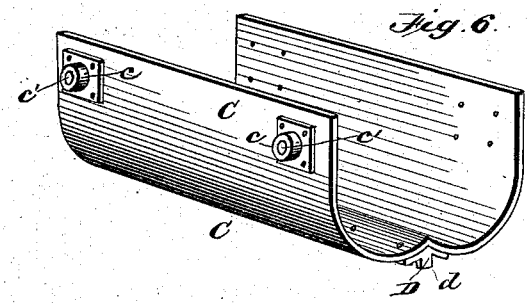
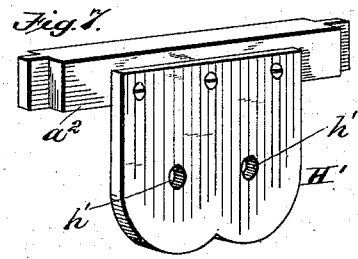
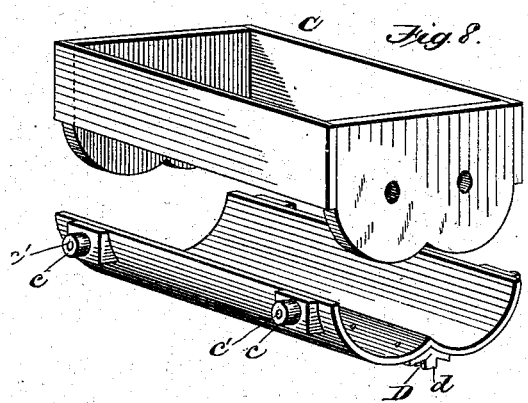
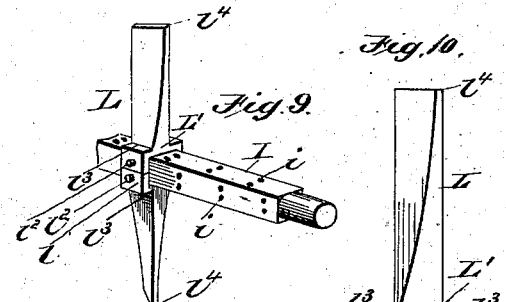
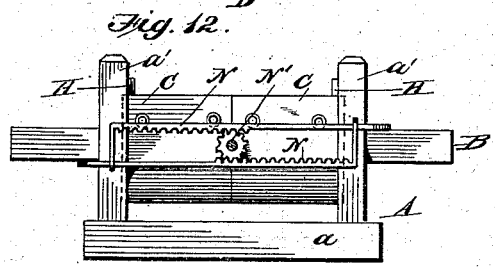
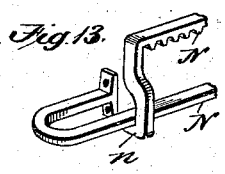
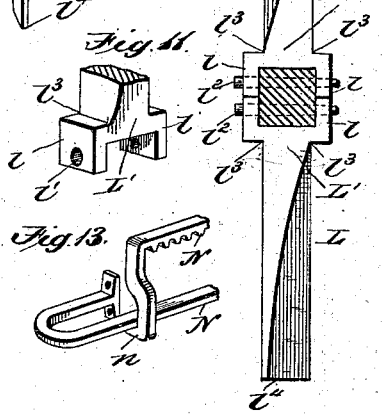
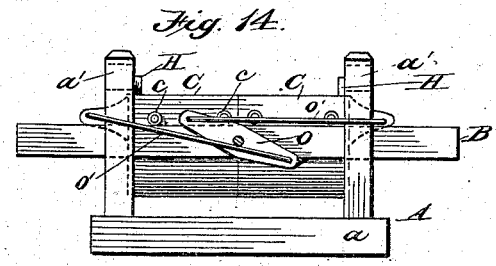
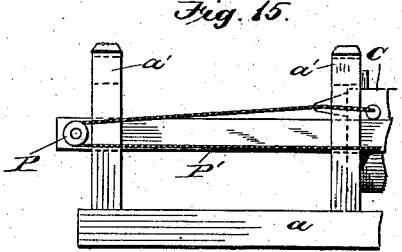
Attest:
Z. Fenno,
W. J. Spencer
Inventor:
W. H. H. Knight

UNITED STATES PATENT OFFICE.

WILLIAM H. H. KNIGHT, OF WASHINGTON, D. C., ASSIGNOR TO THE BARBER ASPHALT PAVING COMPANY, OF SAME PLACE.

ASPHALT-MIXING MACHINE.

SPECIFICATION forming part of Letters Patent No. 293,180, dated February 5, 1884.

Application filed January 3, 1884. (No model.)

*To all whom it may concern:*

Be it known that I, WILLIAM H. H. KNIGHT, of Washington, in the District of Columbia and United States of America, have invented certain new and useful Improvements in Machines for Mixing Asphalt, Concrete, &c.; and I do hereby declare the following to be a full, clear, and exact description thereof, sufficient to enable others skilled in the art to which my invention appertains to make and use the same, reference being had to the accompanying drawings, forming a part of this specification, and to the letters of reference marked thereon.

Figure 1:
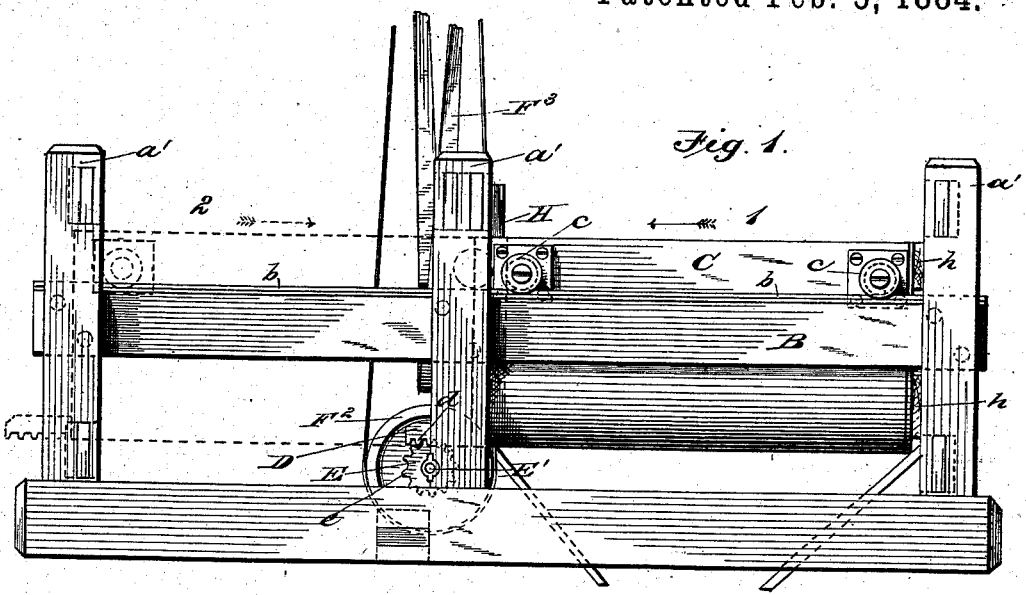
Figure 2:
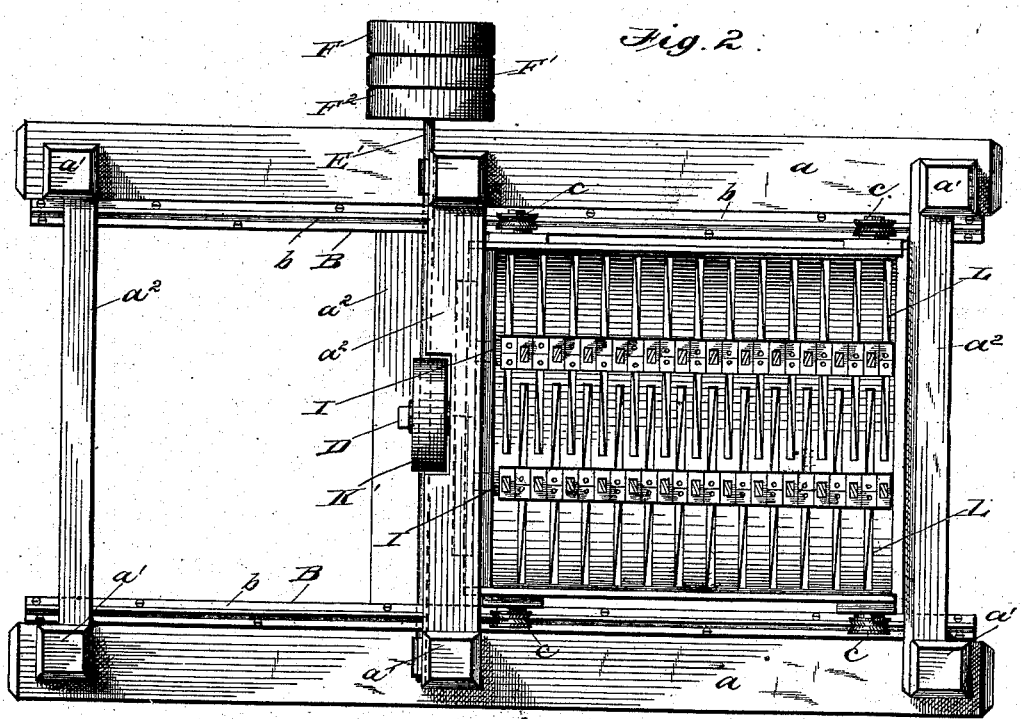
Figure 3:
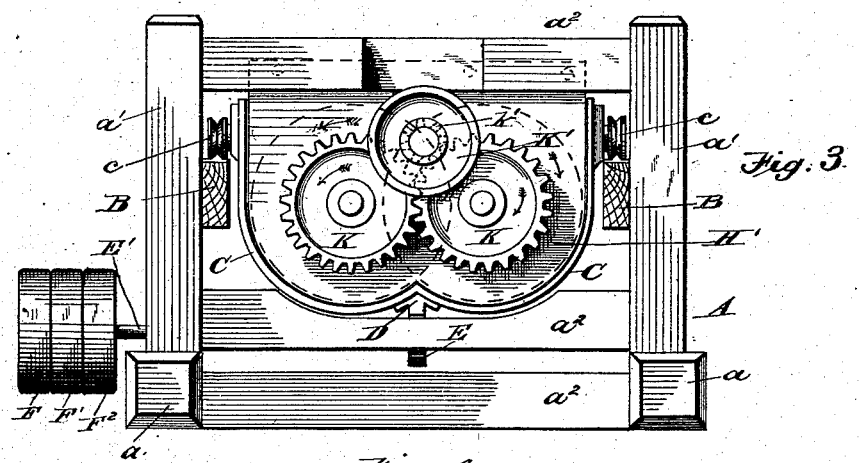
Figure 4:
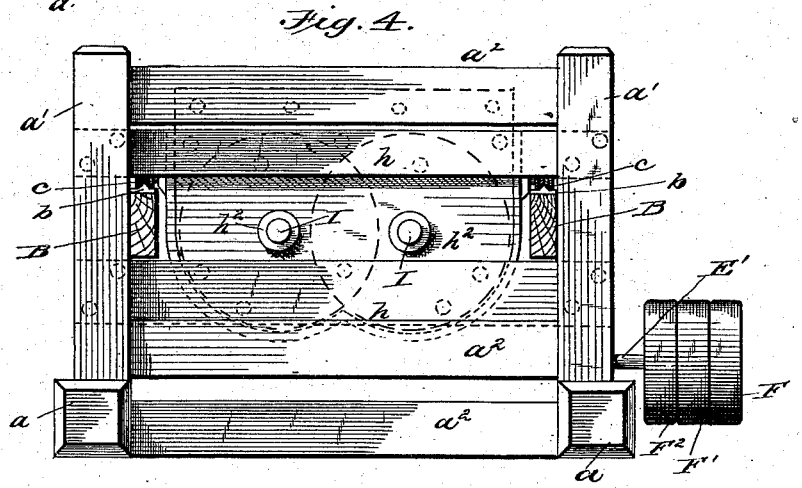
Figure 5:
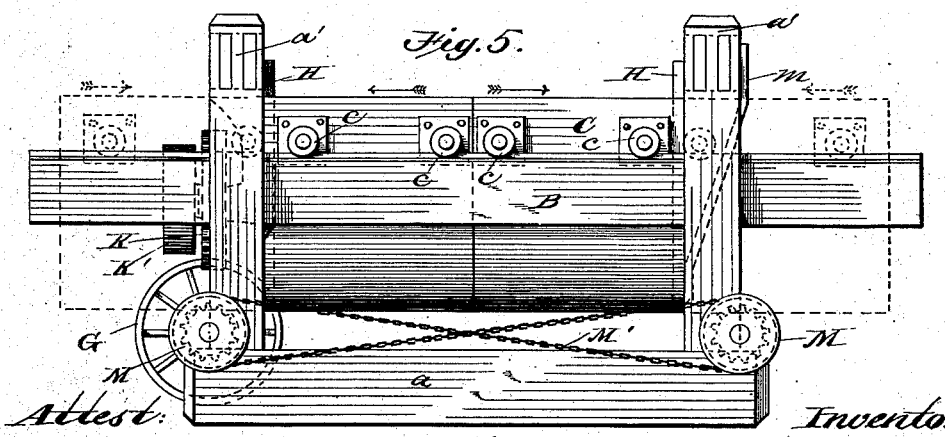

In said drawings, Figure 1 represents a side elevation of my improved mixing-machine. Fig. 2 represents a top plan view thereof. Fig. 3 is an elevation of the front end of the machine. Fig. 4 is an elevation of the rear end thereof. Fig. 5 is a side elevation of one form of my invention, showing a two-part shell. Fig. 6 is a perspective view of the shell or case of my improved mixer. Fig. 7 is a perspective view of one of the metallic ends of the mixing-machine. Fig. 8 shows one form in which the shell or case may be made. Figs. 9, 10, and 11 represent the mixer-blades, and show the manner of securing them to the shafts of the machine. Figs. 12 to 15, inclusive, represent views of different ways of moving the shell.

Similar letters of reference in the several drawings denote similar parts.

My invention relates to machines for mixing asphalt, concrete, and analogous materials, and has for its object the provision of means whereby the material, after being acted upon by the mixing-blades within the shell or case, may be passed from said shell or case directly downward and into carts or other receptacles placed below, such downward passage of the material being effected without loss of time, and also without aid from the machine operator, as is necessary in the majority of mixing-machines now in use.

The invention further has for its object the provision of means whereby any one of the blades may be quickly and easily removed from or replaced upon the shafts without interfering with any other but the one being so removed or replaced. Thus, when a blade is broken or otherwise injured, it is but the work of a few moments to replace it by a new or sound one.

To the accomplishment of the above-named objects, my invention consists in a mixing-machine the shell of which forms the bottom of the mixing-apartment, and provided with means whereby the entire bottom may be moved longitudinally, as hereinafter described and claimed.

It further consists in the combination of a bottom having longitudinal movement imparted to it by suitable means, with ends fixed securely to the frame of the machine, said ends supporting and forming bearings for the mixer-shafts, as hereinafter described.

It further consists in the form of the mixer-blades, and in the manner in which said blades are secured to the shafts, whereby they may be quickly removed from or replaced upon said shafts without interfering in any way with any but the one being so removed or replaced; and, finally, it consists in the arrangement and combination of the various parts as a whole, substantially as hereinafter described and claimed.

Referring to the drawings, A represents the frame of the machine, consisting of the sills $a$, uprights $a'$, and cross-timbers $a^2$. While in practice I prefer the form of frame shown in Figs. 1 to 4—*i. e.*, a frame having three sets of uprights, whereby two bays or spaces, 1 and 2, are formed, (see Fig. 1,) said spaces being alternately occupied by the shell or case, as hereinafter described—I do not limit myself to this form of frame alone, inasmuch as said frame may have but two sets of uprights. (See Fig. 5 in which figure the shell is shown as being in two equal parts, for a purpose hereinafter set forth.)

B represents timbers bolted or otherwise secured to the inside faces of the uprights $a'$ at each side of the machine, (see Fig. 2,) and extending from end to end of the frame A. Said timbers lie in planes parallel with the sills $a$ of the frame, and are provided upon their upper surfaces with metal tracks $b$, the upper surfaces of which are provided with inverted V-shaped ridges, upon which rest and travel grooved rollers c, mounted upon studs c', projecting from the sides of the shell C.

C represents the shell or case, within which the material is mixed. Said shell is in form as shown in Fig. 6, without ends, and having a curved bottom that corresponds with the circular path traveled by the outer ends of the blades, said path indicated by the dotted lines in Figs. 3 and 4.

D represents a rack-bar, secured to the outside surface of the bottom of the shell at the middle thereof. The teeth d of the bar engage with the teeth e of a pinion, E, mounted upon a shaft, E', journaled in bearings e' on the uprights a'.

F F' F² represent pulleys mounted upon one end of the shaft E', for the purpose of rotating said shaft by power, and thus moving the shell backward or forward, as desired, for which purpose one of said pulleys, F', is an idler. F³ represents a belt extending from the pulleys named to driving-pulleys not shown in the drawings. It will be understood that the shaft E' is only to be rotated when it is desired to move the shell C from end to end of the frame, for the purpose of discharging the material within said shell, and also that the direction in which said shaft rotates may be changed by suitable belt-shifters, for the purpose of moving said shell back to its normal position below the mixing-blades. If desired, a hand-wheel, G, (see Fig. 5,) may be mounted upon one end of the shaft E', and the shell moved back or forth without the application of power.

H H' represent the heads or ends of the machine. Said ends are made separate from the shell C, and one of them, H, is secured to cross-timbers h, that extend from one to the other of the uprights at one end of the machine. (See Figs. 1 and 2.) The remaining end piece, H', is suspended from the central cross-timber, $a^2$, between the central pair of uprights, a'. (See Figs. 1, 2, and 3.)

I I represent the mixer-shafts, provided with mixing-blades L. The shafts I are square in cross-section, as shown in Fig. 10, between the heads or ends H H', and each end of said shafts is turned down to form journals, and said journals rest in bearings h', formed in the heads or ends H H'.

$h^2$ represents collars secured upon the ends of the journals outside of and bearing against the end H.

K K represent spur-wheels mounted upon the opposite ends of the shafts I, outside of the head or end H'. Said spur-wheels gear with each other, and are rotated by a pulley, K', mounted upon a stud, k, above one of the spur-wheels K. The pulley K' is provided with a pinion, k', (shown in dotted lines,) that engage with the teeth of one of the spur-wheels K. (See Fig. 3.) If desired, the pulley K' may be mounted directly upon the end of one of the shafts I, outside of the spur-wheel thereon. (See Fig. 5.)

L represents the mixer-blades, the ends next the shafts of which are bifurcated and shouldered, as shown at L', Figs. 9 to 11. The arms l of such bifurcated portion L' extend half across the shaft, and are provided with apertures l' for the reception of tapering pins $l^2$, that pass (when the blades are in place upon the shafts) through the arm l, and also through apertures i in the shafts. By making the pins $l^2$ in tapering form I am enabled to draw the blades down harder upon the shafts, and at the same time such taper enables the pins $l^2$ to be easily and quickly removed, a slight blow from a hammer operating to free the pins. The blades L are square in cross-section at the points $l^3$, and from thence the sides or faces are cut away to the outer ends, $l^4$, at which point the faces are oblique, or at an angle of about forty degrees with the point $l^3$, by which construction the faces between the points $l^3$ and $l^4$ are somewhat spiral in form. When the shafts I, carrying the blades, are rotated in the direction indicated by the arrows in Figs. 3 and 4, the spiral faces of the blades will operate to more thoroughly mix the material in the shell C, inasmuch as the particles of the materials are caused to be moved in different directions at the same moment, whereby better results are attained in quicker time than with any form of blade in use in machines of this class.

The operation of my improvement is as follows: The material to be mixed is placed in the shell C and the shafts I, carrying the blades, rotated. When sufficiently mixed, the case or shell is, by the rotation of the shaft E' and pinion E, moved outward in the direction of the arrows, Figs. 1 and 5, and from under the mixing-blades, whereby the material is allowed to fall into a cart or other receptacle placed beneath. The shell is now, by the reverse movement of the shaft E', returned to its normal position, and is again ready for another charge. It will be seen that the longitudinal movement of the shell may be effected in a very short time and with perfect ease.

In Fig. 5 I have shown the shell C cut into two equal halves, each of said halves having the rack D secured to its bottom, and said halves are moved away from each other in the direction of the arrows by shafts E' and pinions E, located one at each end of the frame. One end of each of said shafts E' is provided with chain or sprocket wheels M. Said wheels are connected by a chain, M', crossed at its center, whereby the shafts are caused to rotate in opposite directions. A hand-wheel, G, is mounted upon one of the shafts, whereby rotary motion is imparted to the shafts E'.

In lieu of the cross-timbers h, as used in the form shown in Fig. 1, one end of the mixer is provided with braces m, that extend from the cross-timber $a^2$ to the lower portion of the head H.

In Fig. 8 I have shown a portion of the sides of the shell connected to the ends thereof, the bottom of the shell formed like that shown in Fig. 6, and having longitudinal movement.

In Fig. 12 I have shown a shell formed in two parts, as that shown in Fig. 5, said parts being moved in opposite directions by racks N, connected one to each half of the shell, and having motion imparted to them by a pinion, N', mounted upon a stud projecting from the timber B. The pinion N' is rotated by hand or power, as desired.

In Fig. 13 I show how the free end $n$ of the rack N is bent toward and looped about the body of its fellow.

Fig. 14 shows a two-part shell operated by a double-crank arm, O, and connecting-rods O'; and Fig. 15 shows the shell operated by a drum, P, and cords P'.

It will be seen that each and all of the forms of mixers shown in the drawings and described herein have the same general principle—to wit: the longitudinal movement of the shell, in whole or in part; and although I have shown a variety of means for accomplishing such movement, I yet do not limit myself to the forms shown, as said shell or shells may be moved in a variety of ways not shown or described herein, each and all of which, however, are within the scope of my invention, that invention being a shell without ends moved by any means whatever for the purpose of discharging its contents.

Having thus described my invention, I claim and desire to secure by Letters Patent—

1. In a mixing-machine for asphalt, concrete, and other analogous material, the combination of a frame provided with mixing shafts and blades, with a shell or bottom in which the material to be mixed is placed, said shell or bottom having no ends, and means substantially as described, whereby the shell or case may be moved longitudinally, as and for the purpose set forth.

2. In a mixing-machine for asphalt, concrete, and other analogous material, a frame provided with mixing shafts and blades, in combination with a bottom provided at its bottom and sides with gear rack-bar and rollers, and means for moving said open-ended shell or case in longitudinal direction, substantially as herein set forth and described.

3. In a mixing-machine for asphalt, concrete, and other analogous material, a shell without ends, and provided with gear rack-bar and rollers, in combination with track-timbers secured to the frame, stationary ends, mixing shafts and blades, and means, substantially as described, whereby said shell and mixing-blades are operated, as herein set forth.

4. In a mixing-machine for asphalt, concrete, and other analogous material, the shell C, formed without ends, and provided upon its bottom with a geared rack-bar, D, and upon its sides with rollers $c$, in combination with a gear-pinion, E, mounted upon shaft E', journaled in bearings $e'$, said pinion E engaging with the rack-bar D, for the purpose of moving the shell endwise, timbers B, secured to the frame, and provided with tracks $b$, upon which the rollers $c$ travel, and mixing shafts and blades, substantially as described.

5. In a mixing-machine for asphalt, concrete, and other analogous material, the ends H H', made separate from the shell C, said ends secured to the frame A, and provided with bearings $h'$, in which are journaled the mixer-shafts I, in combination with said shafts I, and shell C, provided with rack-bar D, rollers $c$, and means, substantially as described, whereby said shell is moved back and forth, as and for the purpose specified.

6. In a mixing-machine for asphalt, concrete, and other analogous material, blades L, the faces at the outer ends of which are at an angle of about forty degrees with the face at a point near the shaft, the face-surface between the points named being somewhat spiral in form, as and for the purpose specified.

7. In a machine for mixing asphalt, concrete, and material of an analogous nature, the blades L, having faces spiral in form, said blades having a bifurcated end, L', the arms $l$ of which embrace the shafts I, and are held in position upon said shafts by tapering pins $l^2$, that pass through said arms and shafts, substantially as herein described.

In testimony that I claim the foregoing I have hereunto set my hand this 3d day of January, 1884.

W. H. H. KNIGHT.

Witnesses:
JOSEPH PAUL,
JAMES H. SMITH.